United States Patent
Conze

(10) Patent No.: US 9,630,654 B2
(45) Date of Patent: Apr. 25, 2017

(54) BODY STRUCTURAL ELEMENT AND METHOD FOR PRODUCING A BODY STRUCTURAL ELEMENT

(71) Applicant: Bayerische Motoren Werke Aktiengesellschaft, Munich (DE)

(72) Inventor: Michael Conze, Langenbach (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 91 days.

(21) Appl. No.: 14/801,365

(22) Filed: Jul. 16, 2015

(65) Prior Publication Data

US 2016/0016614 A1 Jan. 21, 2016

Related U.S. Application Data

(63) Continuation of application No. PCT/EP2014/050592, filed on Jan. 14, 2014.

(30) Foreign Application Priority Data

Jan. 17, 2013 (DE) .................. 10 2013 200 677

(51) Int. Cl.
  *B62D 25/06* (2006.01)
  *B29C 70/34* (2006.01)
  (Continued)

(52) U.S. Cl.
  CPC .......... *B62D 25/06* (2013.01); *B29C 37/0085* (2013.01); *B29C 43/18* (2013.01);
  (Continued)

(58) Field of Classification Search
  CPC .... B62D 29/048; B62D 25/06; B29C 70/763; B29C 70/78
  (Continued)

(56) References Cited

U.S. PATENT DOCUMENTS 6,315,326 B1 11/2001 Mueller et al.
8,070,904 B2 12/2011 Howe et al.

FOREIGN PATENT DOCUMENTS

DE 298 13 152 U1 12/1998
DE 10 2006 058 602 A1 6/2008
(Continued)

OTHER PUBLICATIONS

International Search Report dated Apr. 22, 2014 (Two (2) pages).
German Search Report dated Oct. 14, 2013, with Statement of Relevancy (Six (6) pages).

*Primary Examiner* — Jason S Morrow
(74) *Attorney, Agent, or Firm* — Crowell & Moring LLP

(57) ABSTRACT

A method for producing a body structural element, which can be a roof bow for a motor vehicle, consists of a main body made of fibre-reinforced plastic and a metal connection part. In one or more embodiments, the method includes preparing the metal connection part, preparing a fiber-plastic matrix semifinished product from a duromer resin system and carbon fibers, and overlapping the metal connection part and the fiber-plastic matrix semifinished product in a compression mold. In certain embodiments, the method further includes compressing the metal connection part with the fiber-plastic matrix semifinished product until a fiber-plastic matrix molding material penetrates into undercuts of the metal connection part, and then curing the fiber-plastic matrix semifinished product to form the main body made of fiber-reinforced plastic, wherein the main body is connected in a form-fitting manner to the metal connection part.

13 Claims, 2 Drawing Sheets

(51) Int. Cl.
  B29C 70/86    (2006.01)
  B29C 37/00    (2006.01)
  B29D 99/00    (2010.01)
  B62D 29/00    (2006.01)
  B29C 43/18    (2006.01)
  B29C 70/46    (2006.01)
  B29C 70/68    (2006.01)
  B29C 70/76    (2006.01)
  B29L 31/30    (2006.01)
  B29K 705/02   (2006.01)
  B29K 705/00   (2006.01)
  B29K 33/04    (2006.01)
  B29K 105/08   (2006.01)
  B29K 307/04   (2006.01)

(52) U.S. Cl.
  CPC .......... *B29C 70/345* (2013.01); *B29C 70/465* (2013.01); *B29C 70/683* (2013.01); *B29C 70/76* (2013.01); *B29C 70/86* (2013.01); *B29D 99/0003* (2013.01); *B62D 29/004* (2013.01); *B29K 2033/04* (2013.01); *B29K 2105/0872* (2013.01); *B29K 2307/04* (2013.01); *B29K 2705/00* (2013.01); *B29K 2705/02* (2013.01); *B29L 2031/3002* (2013.01)

(58) Field of Classification Search
  USPC ........................................................ 296/210
  See application file for complete search history.

(56)  References Cited

FOREIGN PATENT DOCUMENTS

| | | |
|---|---|---|
| DE | 10 2007 028 536 A1 | 12/2008 |
| DE | 10 2010 054 097 A1 | 6/2012 |
| DE | 10 2011 100 050 A1 | 10/2012 |
| DE | 10 2012 001 577 A1 | 8/2013 |
| WO | WO 85/03683 A1 | 8/1985 |

BODY STRUCTURAL ELEMENT AND METHOD FOR PRODUCING A BODY STRUCTURAL ELEMENT

CROSS REFERENCE TO RELATED APPLICATIONS

This application is a continuation of PCT International Application No. PCT/EP2014/050592, filed Jan. 14, 2014, which claims priority under 35 U.S.C. §119 from German Patent Application No. 10 2013 200 677.2, filed Jan. 17, 2015, the entire disclosures of which are herein expressly incorporated by reference.

BACKGROUND AND SUMMARY OF THE INVENTION

The present invention relates to a body structural element consisting of a main body made of fiber-reinforced plastic and a metal connection part, i.e., a so-called hybrid component that consists of at least two different materials, as well as a method for producing such a body structural element for a motor vehicle.

A known body structural element, for example, is a bracing, such as a roof bow, for example, which in the vehicle crosswise direction connects a left roof frame and a right roof frame with one another and therefore produces rigidity of a vehicle body and increases so-called crash resistance of the vehicle body. In known vehicle bodies made of metal, in particular steel, this type of body structural element consists also of metal and is usually fixed to the vehicle body by means of a welded connection or another known connection.

An object of the present invention is to provide a body structural element and a method for producing a body structural element, wherein the body structural element can be produced easily and is lighter while maintaining identical rigidity and strength, and where the body structural element can be connected easily to a traditional vehicle body made of metal or a traditional vehicle body gate made of metal.

This problem is solved by for producing a body structural element, which can be a roof bow, for example, and which has a main body made of fiber-reinforced plastic and a metal connection part, in particular for a motor vehicle, the method including:

Preparation of the metal connection part,
Preparation of a particularly pre-impregnated fiber-plastic matrix semifinished product consisting of a resin system and fibers, wherein the resin system can be a duromer resin system and the fibers in particular can be carbon fibers,
Overlapping configuration of the metal connection part and the fiber-plastic semifinished product in a compression mold,
Compressing the metal connection part with the fiber-plastic matrix semifinished product until a fiber-plastic matrix molding material penetrates into undercuts of the metal connection part, and
Curing or fully reacting the fiber-plastic matrix semifinished product to form the main body made of fiber-reinforced plastic, which is connected in a form-fitting manner to the metal connection part.

The metal connection part is particularly developed in such a fashion that it can be connected with a metal body structure or a metal body gate, for example by means of welding, gluing, soldering, riveting or screwing.

The method provides an option to connect a metal connection part with said main body in a form-fitting manner already when producing a main body from fiber-reinforced plastic so that a sufficiently permanent, solid and rigid connection between the main body and the metal connection part is created. With the method described, both fibers as well as the plastic matrix can penetrate into the undercut of the metal connection part by means of compression. In other words, fibers can penetrate into the undercut by compression and therefore develop the connection between the main body and the metal connection part to be sufficiently robust.

According to a further development of the method of the present invention, the step of curing, i.e. the complete reaction of the fiber-plastic matrix, is performed by the feeding of heat. The feeding of heat can be carried out by means of the compression mold, for example.

This reduces the number of process steps for producing the body structural element.

According to an advantageous further development of the present invention, the metal connection part is positioned in the overlapping configuration step in the compression mold overlapping between two, in particular pre-impregnated fiber-plastic matrix semifinished products.

By this means it is possible that the fiber-plastic matrix molding material can penetrate into undercuts of the metal connection part from both sides. This advantageously improves a connection between the metal connection part and the main body.

During the compression step, an additional form-closed or frictional connection is advantageously established between the metal connection part and the main body.

Furthermore, during the step of preparing the metal connection part, the metal connection part can be advantageously coated. For this purpose, a cathodic immersion process is used for the coating. By means of said coating, an electrically insulating layer can be formed in an overlapping area between the metal connection part and the main body.

This provides corrosion protection for the metal connection part.

In addition or as an alternative, the coating can also be a layer to promote adhesion, so that in addition to the form-fitting connection between the metal connection part and the main body, it produces an improved material-formed or frictional joint, which further reinforces a connection between the metal connection part and the main body.

Advantageously, during the step of preparing the metal connection part, through holes are introduced in an overlapping area of the metal connection part. For this purpose, the through holes are forming the undercuts of the metal connection part. Through holes can be circular bores. However, the through holes can also have any other suitable form and they can also be introduced into the metal connection part in another manner, for example by punching, laser beam cutting, or milling.

According to a further development of the method, a duromer resin system is used with the fiber-plastic matrix semi-finished product. The duromer resin system can particularly be an unsaturated polyester resin. Preferably, a so-called carbon fiber sheet molding compound (SMC) or a carbon fiber bulk molding compound (BMC) is used.

The fibers can be carbon fibers, but they can also consist of any other suitable fibers, such as glass fibers, for example.

The above-mentioned problem is furthermore solved by a body structural element that is produced by an above-mentioned method according to the present invention. The body structural element according to the present invention comprises at least one main body of fiber-reinforced plastic as well as at least one metal connection part that is connected thereto in a form-fitting manner. The metal connection part has undercuts into which the main body engages.

The main body is preferably a profiled support element. The main body is particularly rigid for this reason and can sufficiently absorb bending moments in various directions.

Preferably, a metal connection part is formed on each end of the main body. The main body preferably has two ends, with a metal connection part being connected to each of said ends.

Consequently, the body structural element can be used for connecting two elements of the body structure or of a body frame.

According to a further development of the body structural element, the main body of which is a profiled support element, the main body has a U-shaped profile. The main body has in particular a U-shaped profile in a section across its longitudinal axis. The main body advantageously has multiple U-profiles that are connected to one another, for example two U-profiles connected to one another. Because a U-profile is an open profile, it can therefore be easily produced with a compression mold made of a fiber-plastic matrix semifinished product.

The metal connection part is preferably a formed metal sheet. The metal sheet can consist of steel or aluminum, for example. The metal sheet is preferably profiled, in particular preferably profiled corresponding to the main body.

According to a further development of the body structural element, the overlapping area of the metal connection part comprises essentially vertical walls and essentially horizontal walls, wherein the undercuts, in particular the through holes, are formed in the vertical walls and/or horizontal walls.

The body structural element is preferably used for connecting to a body structure made of metal and/or to a body gate made of metal by means of the metal connection part. For this purpose, the body structural element is developed such that it stiffens the body structure or the body gate and/or increases a strength of the body structure or the body gate.

The body structural element is preferably a roof bow. A roof bow extends from a left roof frame to a right roof frame in crosswise direction to the vehicle.

To the extent possible, the above-mentioned further developments of the invention can be combined with one another in various ways.

A brief description of the figures follows:

Other objects, advantages and novel features of the present invention will become apparent from the following detailed description of one or more preferred embodiments when considered in conjunction with the accompanying drawings.

An embodiment of the present invention is described below with reference to FIGS. 1 to 4.

DETAILED DESCRIPTION OF THE DRAWINGS

Figure 1:
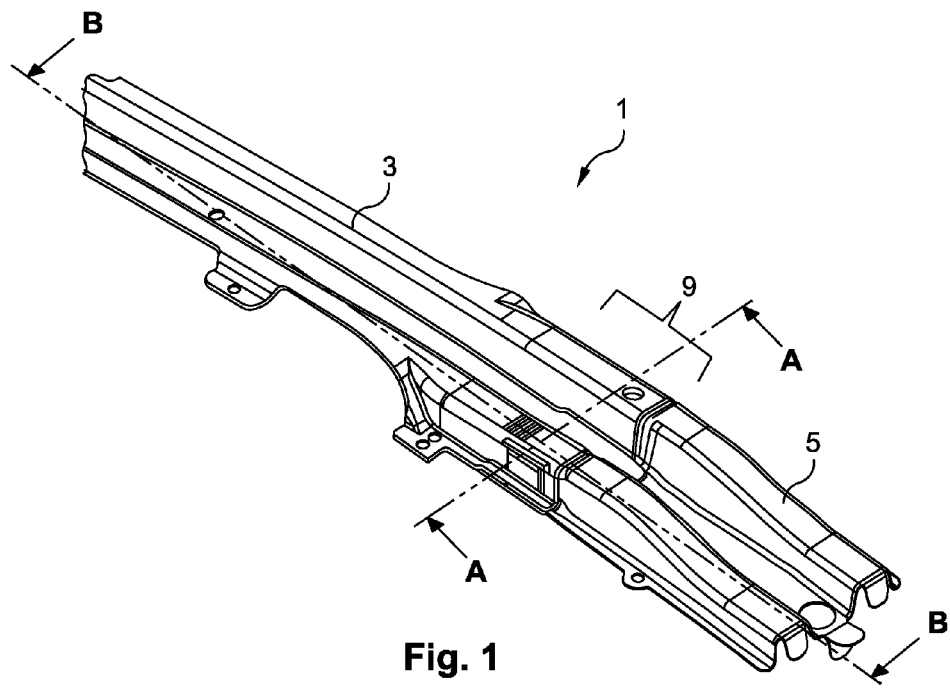
FIG. 1 is a schematic perspective view of a section of a body structural element according to an embodiment of the present invention.

FIG. 1 is a schematic perspective view of a roof bow 1 according to the embodiment of the present invention. The roof bow 1 is a body structural element according to the present invention. FIG. 1 merely illustrates a section of the roof bow 1. The roof bow 1 consists essentially of a main body 3 made of fiber-reinforced plastic and two metal connection parts 5, which are attached at each end of the main body 1, wherein FIG. 1 illustrates merely one metal connection part 5. The main body 3 and the metal connection parts 5 overlap reciprocally in overlapping areas 9. The main body 3 and the respective metal connection part 5 are connected to one another in a form-fitting manner in the overlapping area 9.

The main body 3 consists of a carbon fiber-reinforced plastic that is produced in a so-called carbon fiber SMC process. The plastic matrix of the carbon fiber-reinforced plastic consists of a duromer resin system, preferably of an unsaturated polyester resin.

Figure 2:
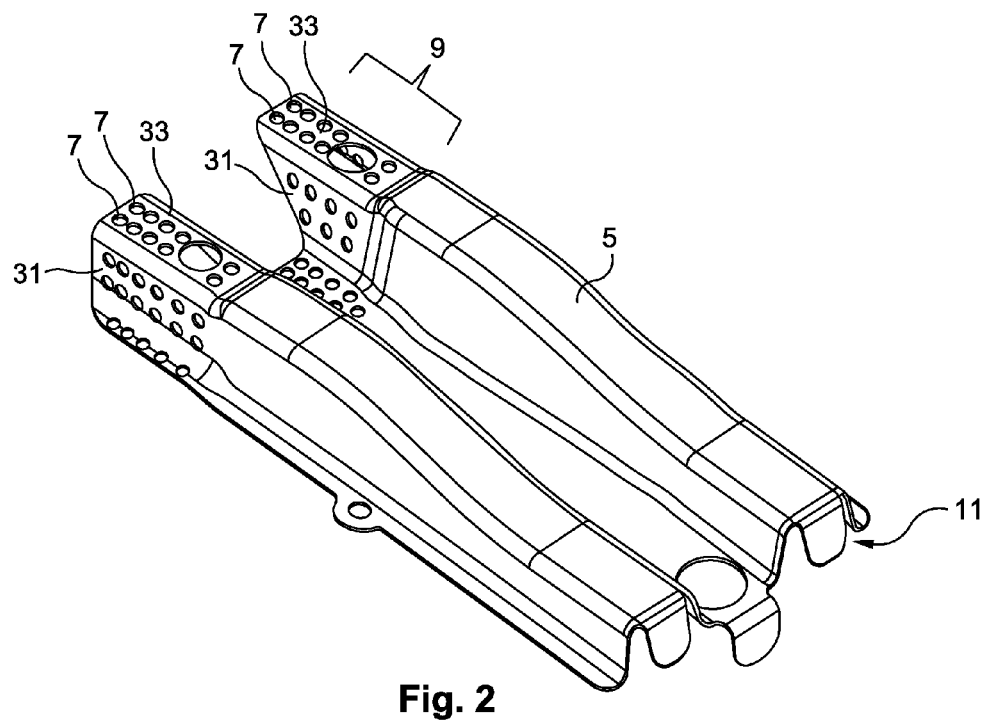
FIG. 2 is a schematic perspective view of a metal connection part of the body structural element according to the embodiment of the present invention.

FIG. 2 illustrates the metal connection part 5 in a schematic perspective view. The metal connection part 5 is profiled analog to the main body 3 in the form of two U-section supports, which are connected to one another by a crosswise connection of the ends of two adjacent shanks. On a left end of the metal connection part 5 in FIG. 2, the overlapping area 9 of the metal connection part 5 is shown. On a right end of the metal connection part 5 in FIG. 2, a connection area 11 for connection with a roof frame of a body of a motor vehicle is formed. The overlapping area 9 has a multitude of through holes 7, which form the undercuts according to the present invention. The through holes 7 are formed both in the vertical walls 31 as well as in the horizontal walls 33 of the metal connection part 5. The through holes 7 can also be formed in the vertical walls 31 only. Alternatively, the through holes 7 can also be formed in the horizontal walls 33 only. The through holes 7 in the embodiment are developed in the form of bores having a circular cross-section. However, it is also conceivable that through holes can have another form.

The metal connection part 5 is developed from a formed steel sheet. The steel sheet has been coated in a cathodic immersion painting process, particularly in order to prevent contact corrosion between the carbon fiber-reinforced plastic and the metal connection part 5.

Figure 3:
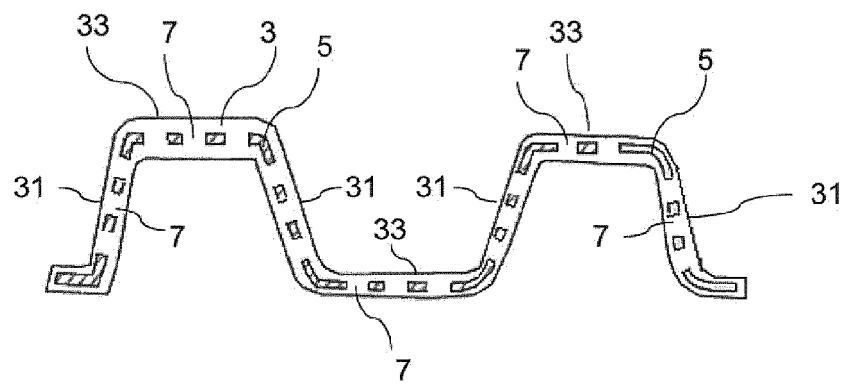
FIG. 3 is a schematic sectional view through an overlapping area across a longitudinal direction of the body structural element according to the embodiment of the present invention.

In the following, the overlapping area 9 is explained in detail with reference to FIGS. 3 and 4. FIG. 3 illustrates a schematic sectional view along line A-A of the overlapping area 9 in a direction crosswise to the longitudinal axis of the roof bow 1 shown in FIG. 1. In the installed condition of the roof bow 1 in the vehicle body, this corresponds to a section along an x-y plane of the motor vehicle coordinate system, wherein an x-axis is a motor vehicle longitudinal axis and a z-axis is a motor vehicle vertical axis. A form of the roof bow 1 can be identified well in FIG. 3. The roof bow 1 according to the above-described metal connection part 5 therefore consists of two essentially U-shaped elements, each of which has a horizontal wall 33, and the essentially vertical walls 31. The two U-profiles are integrally connected to one another by means of a further essentially horizontal wall 33. As can be seen in FIG. 3, the carbon fiber-reinforced plastic of the main body 3 completely surrounds the overlapping area of the metal connection element 5. In other words, carbon fiber-reinforced plastic is developed both on a bottom side as well as on a top side of the metal connection part. The carbon fiber-reinforced plastic furthermore also completely fills the multitude of through holes 7 in the vertical walls 31 and in the horizontal walls 33. In this way, a reliable and permanent form-fitting connection is established between the main body 3 and the metal connection part 5.

Figure 4:
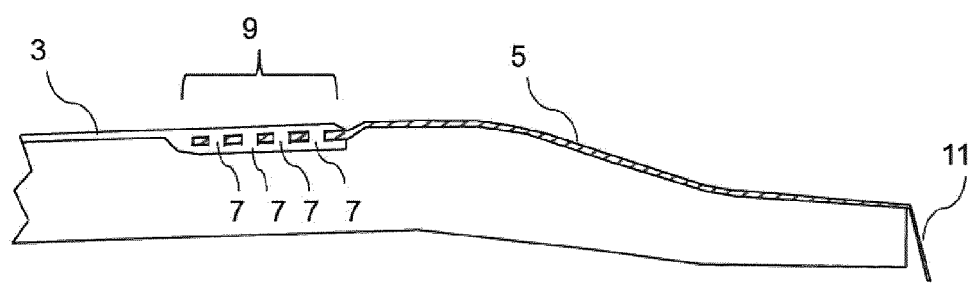
FIG. 4 is a schematic sectional view in the longitudinal direction of the body structural element according to the embodiment of the present invention.

FIG. 4 is a schematic section essentially parallel to a longitudinal axis of the roof bow 1. In the installed condition of the roof bow, the section particularly extends along a plane parallel to a y-axis, i.e. a vehicle transverse axis, and the z-axis of the vehicle coordinate system. The section extends approximately along a line B-B, which is shown in FIG. 1. The overlapping area 9 shown in FIG. 4 is therefore an overlapping area in the area of the horizontal wall 33 of the metal connection part 5.

Described below is a method for producing the roof bow 1 according to the embodiment of the present invention. Initially, the metal connection part 5 is prepared ready-to-install. In other words, it is formed from a steel sheet and the appropriate through holes 7 are introduced by punching or the like. Then the metal connection part 5 is coated with a cathodic immersion painting process, for example.

Thereafter, two pre-impregnated fiber-plastic matrix semifinished products are prepared, which are subsequently intended to form the main body 3. Accordingly, the main body 3 is formed from a bottom fiber-plastic matrix semifinished product and a top fiber-plastic matrix semifinished product.

The pre-impregnated bottom fiber-plastic matrix semifinished product is inserted into the compression mold. Then the right and the left metal connection part 5 is inserted into the compression mold overlapping with the bottom fiber-plastic matrix semifinished product. Thereafter, the top fiber-plastic matrix semifinished product is placed into the compression mold onto the bottom fiber-plastic matrix semifinished product overlapping with the left and the right metal connection part 5. In a further step, the compression mold is closed and the two fiber-plastic matrix semifinished products are molded together. During the press operation, the compression mold is heated in order to initiate a curing reaction of the plastic matrix. During the press operation, the fiber-plastic matrix molding material penetrates into the through holes 7 from both sides.

A carbon fiber SMC molding compound is used as fiber-plastic matrix molding material, for example.

After the main body 3 has been cured or fully reacted and the compression mold is opened, the ready-to-install roof bow 1 is available.

The roof bow 1 can then be inserted into a traditional metal vehicle body for stiffening and be connected onto the right and the left roof frame by welding or the like, just as a traditional roof bow that has been produced completely from metal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a body structural element having a main body made of fiber-reinforced plastic and a metal connection part for a motor vehicle, wherein the method comprises the acts of:

preparing the metal connection part;
preparing a fiber-plastic matrix semifinished product from a duromer resin system and carbon fibers;
overlapping the metal connection part and the fiber-plastic matrix semifinished product in a compression mold;
compressing the metal connection part with the fiber-plastic matrix semifinished product until a fiber-plastic matrix molding material penetrates into undercuts of the metal connection part; and
curing the fiber-plastic matrix semifinished product to form the main body made of fiber-reinforced plastic, wherein the main body is connected in a form-fitting manner to the metal connection part.

2. The method according to claim 1, wherein said curing comprises heating the compression mold.

3. The method according to claim 1, wherein said overlapping comprises positioning the metal connection part in the compression mold overlapping between two pre-impregnated fiber-plastic matrix semifinished products.

4. The method according to claim 1, wherein preparing the metal connection part comprises coating the metal connection part by means of a cathodic immersion process to form at least one of an electrically insulating layer and a layer to promote adhesion in an overlapping area between the metal connection part and the main body.

5. The method according to claim 1, wherein preparing the metal connection part comprises introducing through holes in an overlapping area of the metal connection part which form undercuts of the metal connection part.

6. The method according to claim 1, wherein the fiber-plastic matrix semifinished product comprises a duromer resin system comprised of an unsaturated polyester resin and one of a carbon fiber sheet molding compound and a carbon fiber bulk molding compound.

7. A body structural element, produced in accordance with the method of claim 1, the body structural element comprising a main body made of fiber-reinforced plastic and at least one metal connection part connected to the main body in a form-fitting manner, wherein the metal connection part has undercuts into which the main body engages.

8. The body structural element according to claim 7, wherein the main body is a profiled support element which comprises a metal connection part in particular at each end.

9. The body structural element according to claim 7, wherein the main body comprises a U-profile or a plurality of U-profiles that are connected to one another.

10. The body structural element according to claim 7, wherein the metal connection part is a profiled metal sheet made of steel or aluminum.

11. The body structural element according to claim 7, wherein an overlapping area of the metal connection part comprises essentially vertical walls and essentially horizontal walls, and wherein through holes are formed in the vertical walls and/or in the horizontal walls.

12. The body structural element according to claim 7, wherein the body structural element is configured to connect, by means of the metal connection part, to at least one of a body structure made of metal and to a body gate made of metal, and wherein the body structural element is further configured to at least one of stiffen the body structure, stiffen the body gate, increase a strength of the body structure, and increase a strength of the body gate.

13. The body structural element according to claim 7, wherein the body structural element is a roof bow.

* * * * *